Patented June 25, 1946

2,402,678

UNITED STATES PATENT OFFICE 2,402,678

VACUUM DEHYDRATION OF CORN

Robert M. Schaffner, Chicago, Ill., assignor to The Guardite Corporation, a corporation of Illinois No Drawing. Application June 21, 1944, Serial No. 541,468

3 Claims. (Cl. 99—204)

This invention relates to the vacuum dehydration of corn.

Corn dehydrated by conventional methods has a tendency to darken in color on storage and the dehydrated product is frequently tough in texture and poor in flavor. It has been found that the vacuum dehydration herein described produces a greatly improved dehydrated material which has good flavor and texture on rehydration and the ability to reconstitute itself to a weight at least 80% of that of the original material.

Before drying, the corn is blanched. The customary manner of blanching is in steam or hot water and, while these may be employed, the vacuum blanching method herein described reduces the amount of handling, eliminates contact of the blanched corn with air, reduces the amount of corn milk losses, and improves the product.

In processing the material, the corn is husked, washed on the cob, cut by hand or by machine, and the kernels then loaded on screen bottom trays at densities of about 1.0 to 1.5 lbs. per square foot. The trays are then placed in a vacuum chamber and a vacuum drawn to reduce the pressure to approximately ½ inch of mercury. Steam is then admitted to the chamber to increase the pressure and raise the temperature of the corn from approximately 170° F. to 210° F., the pressure being from 12 inches absolute to 28 inches absolute. The time required for blanching varies with the temperature and 10 minutes is quite satisfactory at 180° F. to 200° F. Slightly longer times are desirable below 180° F. but it is not necessary to reduce the time at the higher ranges. For example, a time of 15 minutes at 200° F. gave a good product.

After blanching, the chamber is again evacuated which cools the product. This evacuation is preferably carried on to reduce the temperature to the neighborhood of 60° F., this being accomplished by reducing the pressure to ½ inch of mercury absolute.

The corn is then dried in an atmosphere of superheated steam at low pressure, without exposing it to the air. This may be done either in the same chamber or in another chamber to which the corn is transferred without breaking the vacuum. A satisfactory apparatus and method for handling the blanching is illustrated in Baer application 524,177, filed February 28, 1944, and Heineman application 520,773, filed February 2, 1944.

The bulk of the drying energy is supplied through intense radiant heat supplied from steam coils surrounding the product and close to it. In the figures herein given, the coils were 2¼-inch external diameter pipes arranged ¼ inch apart in horizontal banks above and below the trays with the nearest point of the coil 3 inches above and 3 inches below the bottom of the trays. Superheated steam is supplied to the drying chamber. In the preferred form the material to be dried is advanced continuously through the chamber which is maintained at approximately 2¼ inches absolute pressure. Superheated steam is introduced at the beginning and end of the chamber and is withdrawn from the middle. The temperature of the source of radiant energy varies during the progress of the drying, this being accomplished by utilizing several banks of coils, each of which may be maintained at a constant temperature which may be different from that in the other banks.

The corn is dried to a moisture content not higher than 8% in a time of from 70 to 180 minutes. In a typical cycle the radiant energy source is first heated to 298° F. and the corn exposed to that heat for 30 minutes, followed by a 20-minute exposure to a source maintained at 274° F., followed by a 90-minute exposure to a source maintained at 228° F. Radiant energy source temperatures, however, have been varied from 350° F. to 190° F., the higher temperature always being at the beginning of the process.

The following table gives examples of corn:

[Operating vacuum pressure 2¾ inches]

| | Test No. | | | | | | | | | |
|---|---|---|---|---|---|---|---|---|---|---|
| | 1 | 2 | 3 | 4 | 5 | 6 | 7 | 8 | 9 | 10 |
| Variety | Tendergold | | | | Golden cross bantam | | | | | |
| Processed, hrs. after harvesting | 48 | 2½ | 1 | 4 | 2 | 5 | 1¾ | 18 | 21¾ | 24¾ |
| Original moisture, per cent | | | 76.2 | 76.2 | 79.9 | 77.9 | 75.6 | 70.0 | 70.0 | 70.0 |
| Final moisture, per cent | 7.9 | 7.2 | 7.0 | 5.4 | 7.2 | 6.1 | 6.5 | 7.4 | 5.5 | 7.3 |
| Color | Good, better than 2, 4, 5, 6, 7. | Fair | Good | Fair, darker than 3. | Good | Good | Good | Excel. darker than 9. | Excel. most yellow. | Excel. darker than 8 and 9. |
| Flavor | Good | Good | do | Good | do | do | do | Good | SO₂ taste | Good. |
| Texture | do | do | do | do | do | do | do | do | Good | Do. |
| Dehydration ratio | 3.80 | 4.17 | 3.40 | 3.69 | 4.16 | 4.50 | 4.15 | 3.03 | 3.03 | 3.09. |
| Rehydration ratio | 3.49 | 3.40 | 3.15 | 3.20 | 3.66 | 3.75 | 3.43 | 3.05 | 2.75 | 2.58. |
| Reconstitution | 91.8 | 81.5 | 93.2 | 86.7 | 88.0 | 83.3 | 82.2 | 101 | 90.8 | 83.5. |
| Pretreatment (other than husking and cutting) | None | None | None | None | None | None | None | 6 liters of 1/1000 NaHSO₃. | SO₂ gas 10 min. 5" vac. | None. |
| Loading lbs./sq. ft | 1.00 | 1.06 | 1.06 | 1.04 | 1.04 | 1.09 | 1.06 | 1.06 | 1.06 | 1.06. |
| Machine blanch temperature °F | 185–194 | 181 | 186–209 | 181–191 | 202–210 | 200 | 200–210 | 200 | 205 | 200. |
| Time minutes | 10 | 10 | 10 | 10 | 10 | 15 | 10 | 10 | 10 | 10. |
| Drying cycle: P—steam coil pressure, pounds/sq. in. M—minutes | P 50 30 5 — 140 | M 30 20 90 | P 50 5 — 170 | M 30 140 | P 50 5 — 180 | M 30 150 | P 60 6 — 170 | M 30 140 | P 60 10 5 — 150 | M 30 20 100 | P 60 10 5 — 150 | M 30 20 100 | P 60 10 6 — 180 | M 30 20 | P 55 10 5 — 170 | M 30 10 130 | P 50 5 — 180 | M 30 5 150 | P 50 5 — 180 | M 30 5 150 |

The dehydration ratio referred to in the table is the result obtained by dividing the raw weight of the corn by its dehydrated weight.

The rehydration ratio in the above table refers to the result obtained by dividing the rehydration weight by the dehydrated weight. The rehydrated weight is taken after boiling the dehydrated corn for 30 minutes in water without previous soaking.

The reconstitution percentage is the rehydration ratio divided by the dehydration ratio which is the same thing as dividing the rehydrated weight by the raw weight.

Batches 8, 9 and 10 were a more mature corn than the other batches. It will be noted that in all cases the corn was a fresh corn and not the customary dried corn of commerce.

The foregoing detailed description has been given for clearness of understanding only, and no unnecessary limitations should be understood therefrom.

What I claim as new and desire to secure by Letters Patent is:

1. The method of drying fresh corn which comprises removing the corn from the cob, spreading on trays, substantially removing air therefrom, blanching the corn in an atmosphere of saturated steam for about 10 minutes at a temperature of approximately 170°–210° F., reducing the pressure, and then drying the blanched corn in an atmosphere of superheated steam while subject to intense radiant energy at low absolute pressure, the temperature of the radiant energy source being not higher than 350° F. at the beginning of the process for a source approximately 3 inches from the corn, and not being lower than approximately 190° F. at the conclusion of the drying process for a source similarly distant, the drying being carried on to produce a moisture content not greater than 8% in the corn.

2. The method as set forth in claim 1, in which the corn is dried for 30 minutes while receiving radiant energy from a source maintained at approximately 298° F. and approximately 3 inches away from the corn, then for 20 minutes from a source similarly distant and maintained at approximately 274° F., and then for 90 minutes from a source similarly distant and maintained at approximately 228° F.

3. The method as set forth in claim 1, in which the corn is loaded in the dryer at approximately 1.0 to 1.5 lbs. per square foot.

ROBERT M. SCHAFFNER.